United States Patent [19]
Van Cleve et al.

[11] Patent Number: 5,979,246
[45] Date of Patent: Nov. 9, 1999

[54] SPRING RATE BALANCING OF THE FLOW TUBE AND A BALANCE BAR IN A STRAIGHT TUBE CORIOLIS FLOWMETER

[75] Inventors: Craig Brainerd Van Cleve, Lyons; Gregory Treat Lanham, Longmont, both of Colo.

[73] Assignee: Micro Motion, Inc., Boulder, Colo.

[21] Appl. No.: 09/020,704

[22] Filed: Feb. 9, 1998

[51] Int. Cl.[6] .................................................. G01F 1/84
[52] U.S. Cl. ........................................................ 73/861.357
[58] Field of Search ...................... 73/861.356, 861.357

[56] References Cited

U.S. PATENT DOCUMENTS

| | | | |
|---|---|---|---|
| 4,823,614 | 4/1989 | Dahlin .............................. | 73/861.357 |
| 4,962,671 | 10/1990 | Stansfeld et al. . | |
| 5,044,207 | 9/1991 | Atkinson et al. .................. | 73/861.357 |
| 5,321,991 | 6/1994 | Kalotay . | |
| 5,347,874 | 9/1994 | Kalotay et al. . | |
| 5,398,554 | 3/1995 | Ogawa et al. ..................... | 73/861.357 |
| 5,497,665 | 3/1996 | Cage et al. ........................ | 73/861.357 |
| 5,531,126 | 7/1996 | Drahm .............................. | 73/861.356 |
| 5,616,868 | 4/1997 | Hagenmeyer et al. ............ | 73/861.357 |
| 5,691,485 | 11/1997 | Endo et al. ........................ | 73/861.357 |
| 5,796,012 | 8/1998 | Gomi et al. ....................... | 73/861.356 |

FOREIGN PATENT DOCUMENTS

| | | |
|---|---|---|
| 0 759 542 A1 | 2/1997 | European Pat. Off. . |
| 0 849 568 A1 | 6/1998 | European Pat. Off. . |

Primary Examiner—Harshad Patel
Attorney, Agent, or Firm—Duft, Graziano & Forest, P.C.

[57] ABSTRACT

A Coriolis flowmeter having a single straight flow tube, a balance bar parallel to said flow tube, a brace bar connecting ends of the balance bar to the flow tube and to a surrounding case. Improved dynamic balance of the flowmeter is maintained in response to changes in density of the flowing material by reducing the spring function of the balance bar and/or the flow tube. This concentrates the spring function of the flowmeter in the brace bar structure. A vibrational node in the brace bar structure separates the effective spring function of the balance bar from the effective spring function of the flow tube. The vibrational node moves within the brace bar in response to materials of different densities in the flow tube at different times. This nodal movement changes the ratio of the effective balance bar spring function to that of the effective flow tube spring function to maintain improved dynamic vibrational balance of the flowmeter without involving the case mass.

27 Claims, 11 Drawing Sheets

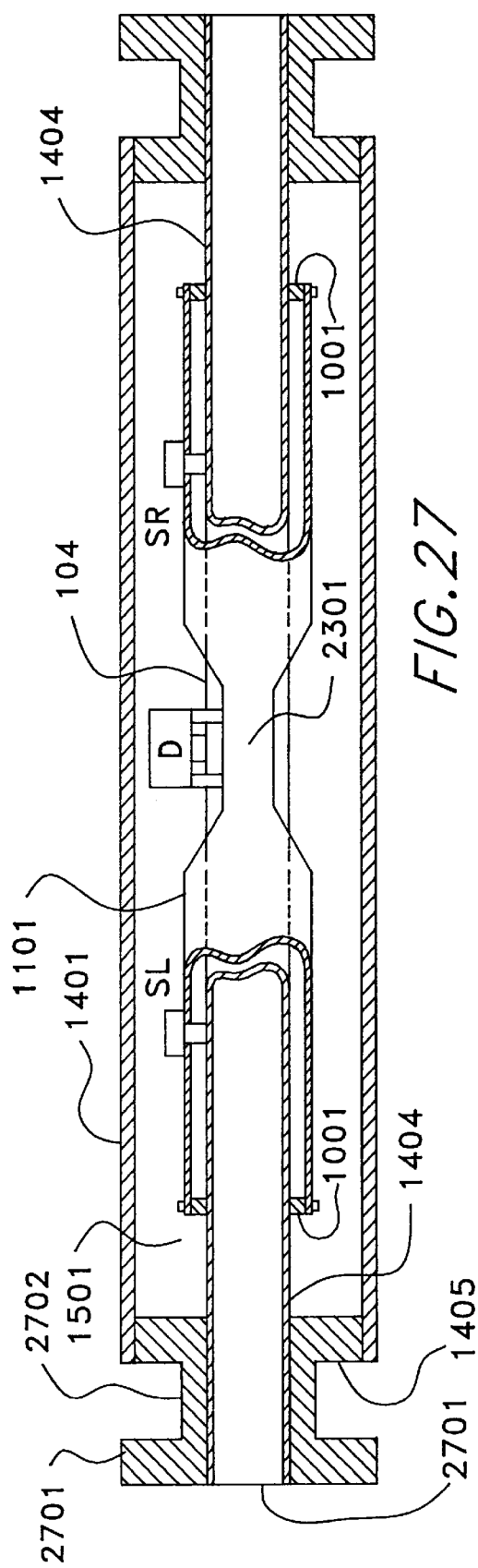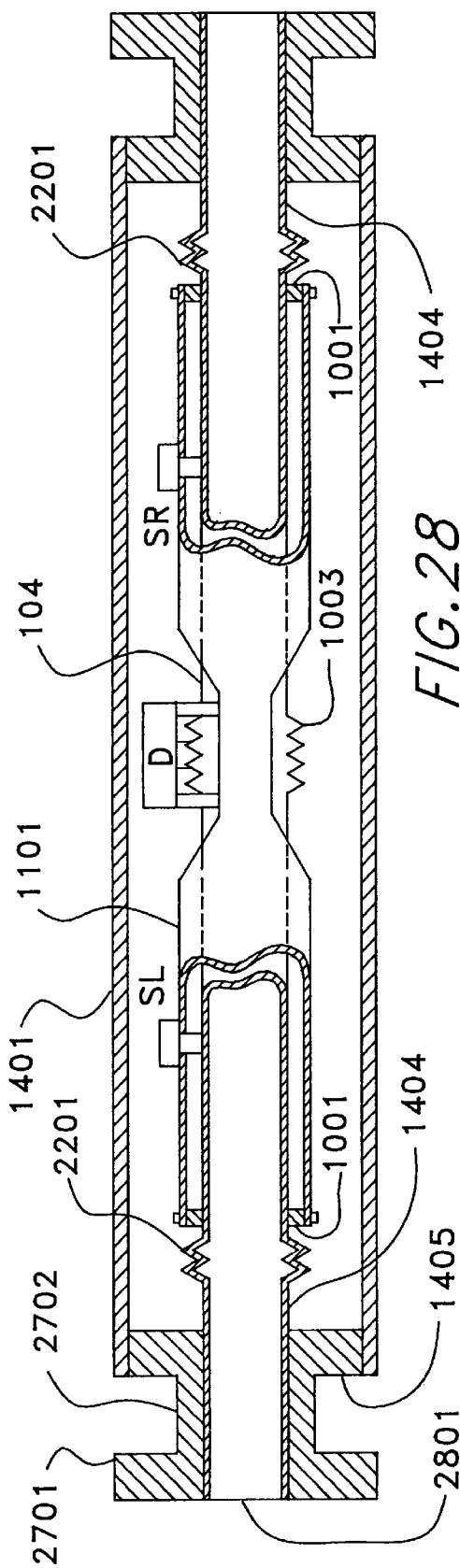

SPRING RATE BALANCING OF THE FLOW TUBE AND A BALANCE BAR IN A STRAIGHT TUBE CORIOLIS FLOWMETER

FIELD OF THE INVENTION

This invention relates to a Coriolis flowmeter and, in particular, to a single flow tube Coriolis flowmeter that maintains dynamic balance between a flow tube and balance bar in response to changes in the density of the flowing material.

PROBLEM

It is a problem in single flow tube Coriolis flowmeters to maintain a dynamic balance between the vibrating flow tube with material flow and the associated balance bar. Single flow tube Coriolis flowmeters are provided with balance bars to maintain a dynamic balance of the flowmeter under varying operating conditions. Balance bars are coupled to the flowmeters flow tube and they vibrate out of phase with the flow tube so that the combination of the balance bar and the vibrating flow tube form a dynamically balanced structure.

Single flow tube Coriolis flowmeters are factory calibrated and dynamically balanced for material having a known specific gravity or for materials having a known narrow range of specific gravities such as 0.8 to 1.0, 1.0 to 1.2, etc. These flowmeters operate satisfactorily and maintain their dynamic balance as long as their use is limited to materials having a specific gravity close to that for which the flowmeter was calibrated. However, it is not always possible for a Coriolis flowmeter to be limited in use to materials having the specific gravity for which the flowmeter was calibrated. The use of a flowmeter with materials of other densities throws the flowmeter out of balance and causes it to shake with a resultant degradation in accuracy.

A single flow tube Coriolis flowmeter typically comprises a flow tube, a balance bar or balance tube (hereinafter balance bar) vibrationally coupled to the flow tube and a surrounding case that encloses the flow tube and balance bar. An extension stub often extends from the flow tube through the case ends so that the flowmeter structure may be coupled to an associated pipeline whose material flow is to be measured. When dynamic balance of a flowmeter is achieved, the end node locations of zero motion are typically at the intersection of the flow tubes and the case ends. A relatively short portion of the flow tube extends inwardly from each case end to a brace bar that is perpendicular to the longitudinal axis of the flow tube and which connects the flow tube to the ends of the balance bar which extends parallel to the flow tube. The material filled flow tube and the balance bar vibrate out of phase with each other in such a manner that the flow tube/balance bar pair form a dynamically balanced structure with the nodes being at the intersection of the flow tube and the case ends. When this dynamic balance is achieved, the case does not vibrate.

Case vibration due to dynamic unbalance occurs when the flowmeter is operated with material having a specific gravity different from that for which the flowmeter was designed and balanced. Under these conditions the location of the nodes shift so that they are no longer in the case end. Depending upon the specific gravity of the new material, the vibrational nodes either shift inward (for a heavier material) away from the case end and in a direction towards the center of the meter or the nodes shift outward (for a lighter material) external to the case and into the pipeline. Under either condition the case vibrates in order to satisfy the law of conservation of momentum and flowmeter accuracy is degraded.

The design of a flowmeter includes the placement of velocity sensors at advantageous locations on the flow tube with respect to the end nodes of the flow tube. It is known that the placement of sensors relatively close to the end nodes enhances flowmeter sensitivity while the placement of sensors further away from the end node decreases flowmeter sensitivity. It is desired that a flowmeter have a fixed and known sensitivity. The movement of the end nodes as the flowmeter is operated with materials of different densities causes the distance between the sensors and the nodes to vary. This varies the sensitivity of the meter and degrades the accuracy of its output information. Although this sensitivity change is relatively small, it is sufficiently large in critical applications so that the degraded output information causes problems for the user.

In summary, the flow sensitivity of a Coriolis flowmeter is a function of the distance between its velocity sensors and the nodes which define the ends of the active flow tube length. In single flow tube flowmeters, changes in the specific gravity of the material flow cause the location of the flow tube's end nodes to change which, in turn, changes the sensitivity of the flowmeter.

A traditional way of solving the balance problem in single flow tube Coriolis flowmeters is to make the mass of the case of the flowmeter as great as possible in order to minimize its vibration amplitude and thereby minimize the change in nodal location. In addition, since the unbalance (which causes the meter vibration) is a function of fluid density, and since the fluid density is determined from flow tube frequency, a software algorithm in the flowmeter electronics is used to modify the flowmeter's flow calibration factor in accordance with the vibration frequency of the flow tube. The main problem with this approach is that it does not take into account the effect of the meter mounting stiffness on the flowmeter vibration amplitude. A soft meter mount results in higher vibration amplitude (and greater nodal location shift) of the meter than does a stiff mount. The corrective algorithm used in the output instrumentation assumes a meter mount having "an average stiffness" and thus under compensates for a soft mount and overcompensates for a stiff mount. This results in a degradation of the accuracy of the output information of the Coriolis flowmeter and its associated instrumentation.

SOLUTION

The present invention solves the above problems and achieves an advance in the art by the provision of a flowmeter having a single flow tube, a balance bar and associated interconnecting structure that maintains the dynamic balance of the flowmeter over a wide range of fluid densities. This dynamic balance is maintained between the flow tube and the balance bar by controlling the characteristics of the spring structure of the balance bar, the flow tube and the connecting structure hereinafter termed a brace bar. The brace bar interconnects the ends of the balance bar with the flow tube and maintains this balance by dynamically altering the resonant frequency of the balance bar to match that of the flow tube when filled with material of different densities. In performing this function, the balance bar behaves like a dynamic balancer and automatically maintains the vibrational amplitude required to counter balance the vibrational amplitude of the flow tube and the fluid therein.

Two fundamental laws of vibrating systems apply to the present invention. The first is that (in the absence of external forces) momentum must be conserved. This means that the mass times velocity in one direction is equal to the mass times velocity in the opposite direction. In a balanced flowmeter the mass of the flow tube and its contained material times its velocity in one direction is equal to the mass of the balance bar times its velocity in the opposite direction. (In sinusoidal motion, velocity is proportional to vibration amplitude. Since the different points along the flow tube and balance bar have varying amplitudes, this becomes a calculus problem.) In an unbalanced flowmeter this law still holds, but the flowmeter case mass, and the connected pipeline mass are also involved since they vibrate either with the flow tube or the balance bar. No matter how much of the world is shaken by the flowmeter, the vibrating masses can be divided into two groups; those vibrating with the flow tube and those vibrating with the balance bar. Conservation of momentum requires that the total momentum of these two groups is equal and opposite.

The second law pertinent to the present invention is that the two halves of a two body vibrating system must have the same resonant frequency. If they didn't have the same resonant frequency, they would constitute separate vibration modes and not the two halves of the same mode. Resonant frequency is equal to the square root of stiffness/mass. Therefore, the two mass groups having the same resonant frequency must have the same stiffness to mass ratio.

In a balanced flowmeter, the flow tube with contained material and the balance bar have the same stiffness to mass ratio since they have the same resonant frequency. When a conventional single flow tube flowmeter is unbalanced by a material of different density, the nodes separating flow tube mass from the balance bar mass move to accommodate the conservation of momentum of the combined structure comprising the flow tube, balance bar, and case. With a more dense material, the nodes move inward on the flow tube so that some of the flow tube mass and case mass vibrate with the balance bar. The result of the shift of mass is that the flow tube natural frequency drops less than the increased fluid density would indicate because the flow tube gives up some mass to the balance bar. Also, the balance bar natural frequency drops from the added mass comprising part of the flow tube and case so that the mass/stiffness ratios and resonant frequencies of the two structures stay equal. With low density fluids, the nodes move in the opposite direction and the balance bar gives up mass to the flow tube to keep the resonant frequencies equal.

In the prior art solutions, the shift of the nodal positions primarily shifts mass from one member and the case to the other member. The problem is the involvement of the case mass and the fact that its shaking amplitude is a function of the mounting stiffness which is unknown. Because the case shaking amplitude is unknown, the shift in meter sensitivity is also unknown. The nodal shift with imbalance also alters the spring rates of the two members by making one "spring" longer and the other shorter. But, since the "spring" in each member is spread throughout the structure, the nodal shift distance is very small compared to the "spring" length, and the shift in the spring rates is very small.

In the present invention, the "spring" of each member is concentrated in the vicinity of the end nodes rather than distributed throughout the structure. A shift in nodal location thus significantly alters the effective spring lengths by making one shorter and consequently stiffer and the other longer and softer (spring stiffness is inversely proportional to spring length). In the present invention, the nodal shift with fluid density alters the spring rates in such a manner as to keep the resonant frequencies of the flow tube and the balance bar equal. With the resonant frequencies equal, the vibration amplitudes of the flow tube and balance bar adjust themselves automatically to conserve momentum. By this means, the meter balance is maintained without transferring significant mass or involving the meter case.

In accordance with the present invention, the flow tube and a balance bar are removed from the spring function of the flowmeter and the spring function is concentrated in the brace bar. A structure's significance as a spring can be determined by the amount of spring energy it stores in its deflected state. If an area stores very little spring energy it has very little impact on the frequency of the system. The equation for spring energy, $$E = \tfrac{1}{2}kx^2$$

reveals that spring energy can be made insignificant by making the stiffness, k, very small. When this is done the structure behaves as though there is a hinge or gap in the location of the very soft spring. Spring energy can also be made insignificant in a region by making the spring deflection, x, very small. This can be done either by reducing the loading locally or making the spring stiffness, k, so large that the loading fails to deflect the member. When this is done the structure behaves as though there is a rigid link in the location of the high stiffness. Both of these methods are used to remove the flow tube and balance bar from the (significant) spring function of the flowmeter. The balance bar and the flow tube still remain important to the dynamics of the system, but only as mass elements.

In accordance with one possible preferred embodiment of the present invention, the flow tube is removed from the spring function by removing the middle portion of the flow tube and replacing it with flexible bellows. The bellows have such a low spring rate that they store very little energy despite their high deflection. This soft center section of the flow tube allows it to deform like two rigid cantilever beams loosely coupled at their ends by the bellows. The bending moment in the dynamic portion of the flow tube is so effectively removed by the bellows that the flow tube halves on each side of the bellows undergo very little deformation (they remain relatively straight). The majority of spring deformation and spring energy storage is thus removed from the dynamic part of the flow tube. Because the flow tube must be continuous and cannot end at the brace bars, the flow tube ends (external to the brace bars and internal to the case ends) bend as the rigid cantilever beam sections of the flow tube deflect. These flow tube sections (hereafter called tube stubs) store spring energy as they bend. In the optimum embodiment of the present invention substantially all of the spring energy is contained in the brace bars. The spring energy is thereby removed from the tube stubs by the use of bellows in the tube stubs which eliminate the spring energy in the same manner as do the central flow tube bellows. The entire spring function for the flow tube in the present invention is, by way of the three bellows, caused to reside in the brace bar.

The balance bar of the present invention is also removed from the spring function since it is also made very flexible in its center. Like the flow tube, the remainder of the balance bar is made stiff. The balance bar does not extend beyond the brace bars at its ends therefore it does not need end bellows. The combination of soft in the center and the stiff remainder effectively removes the balance bar from the spring function of the meter. The result of removing the flow tube and balance bar from the spring function of the meter is that the spring function is concentrated almost exclusively in the brace bar.

The concentration of the spring function of the flowmeter in the brace bars is advantageous since the brace bars are relatively short in length and effectively comprise short springs. The flowmeter of the present invention is balanced so that the end nodes which dynamically separate the flow tube spring from the balance bar spring reside in the brace bar. Each end node thus separates the short portion of the effective spring which acts on the flow tube from the short portion of the effective spring which acts on the balance bar. Changes in fluid density cause slight shifts in the nodal positions which (because the springs are so short) cause one spring to get significantly shorter and stiffer and the other to get significantly longer and softer. Conservation of momentum dictates that the nodal location move toward the member with increased mass. For a more dense fluid the nodes move toward the flow tube while for a less dense fluid they move toward the balance bar. The result is that for a more dense fluid, the flow tube spring (located in the brace bar) gets stiffer and the balance bar spring (also located in the brace bar) gets softer. This change serves to maintain the two members at equal resonant frequencies. Conversely, for a less dense fluid, the nodes move toward the balance bar, the flow tube springs get softer and the balance bar springs get stiffer, and equal resonant frequencies are maintained.

When the two flow tube and balance bar have equal resonant frequencies, they act like tuned dynamic balancers for each other. As such, they adjust their relative vibration amplitudes so that momentum is conserved without involving significant case or pipeline vibration. Balance is maintained by altering the vibrating member's spring rates rather than masses. This has a great advantage over the prior art in that reduced case and pipeline vibration reduces the change in meter sensitivity with mounting stiffness.

It was stated earlier that in prior art meters the nodal shift with fluid density produced a slight (insignificant) change in spring rates along with a major change in mass distribution. Conversely the present invention produces a slight shift in mass distribution along with a major shift in spring rates. Two design features are necessary to keep the meter mass involvement minimal. The first is the concentration of the meter spring in the vicinity of the end nodes. The other is that the connection of the flow tube/balance bar dynamic system to the case (or the world if no case is used) must be at points of no vibration amplitude. The only regions in the dynamic system which have no vibration amplitude are, of course, the end nodes. The end nodes are within the brace bar and they shift position with fluid density. The design of the structure connecting the dynamic system to the case (hereafter termed as a case connect link) is therefore critical to maintaining the case vibration amplitude near zero.

The specific design of the case connect links of the present invention is dependant upon the balance bar design. One preferred embodiment of the balance bar has the balance bar concentric with the flow tube such that the flow tube extends through the hollow center of the balance bar. The brace bars then take the form of circular rings which extend from the outside diameter of the flow tube to the inside diameter of the balance bar. The brace bar (rings) are of limited axial length so as to have the proper stiffness to impart the desired resonant frequency to the dynamic structure of the flowmeter. The brace bars are located at the ends of the balance bar.

Given this optimum geometry, the nature of the deformation of each brace bar is determined. The meter is balanced so that the nodal location at each end of the meter is within the brace bar. The inner surface of the brace bar (ring) moves with the flow tube and the outer surface moves with the balance bar. Each node therefore consists of a cylindrical surface between the brace bar outer surface and inner surface. Outward of the nodal surface, the brace bar material oscillates in phase with the balance bar and increases its oscillation amplitude with distance from the nodal surface. Inward of the nodal surface, the brace bar material oscillates in phase with the flow tube and it also has increasing amplitude with distance from nodal surface. The brace bar material is thus seen to deflect in shear, as though it were a torsional spring. The nodal surface separates the effective balance bar spring from the effective flow tube spring. When the amplitude ratio between the flow tube and the balance bar changes due to a fluid density change, the cylindrical nodal surface moves inward or outward changing its diameter. This changes the relative "spring" lengths and maintains equality in the natural frequencies of the two active members despite mass changes of the flow tube. The mass transfer between flow tube and balance bar that occurs with this nodal shifting is insignificant and the case mass need not be involved.

The case connect links must support the dynamic structure of the meter within the case without causing case vibration. The balance bar and flow tube ends behave rigidly with the majority of the deflection occurring in the brace bars. They pivot at each end about common pivot axes. At the pivot axes there is no translation of the balance bar exterior but there is rotational oscillation. In the preferred embodiment the case connect links attach to the exterior of the balance bar ends at the pivot axes. By making them stiff in translation in the direction of vibration, they can support the dynamic structure without imparting vibration to the case. By making the case connect links soft in torsion, spring energy outside of the brace bar can be avoided. In the preferred embodiment, the case connect links are flat butterfly shaped structures that extend along the pivot axes between the exterior of the balance bar and the interior of the case. There are four of them, one on each side of each balance bar end. The flat plane of the links are oriented perpendicular to the tube axis. This geometry renders the connection between the dynamic structure and the case rigid in the direction of the flow tube/balance bar vibration. The "waist" of the butterfly shape, which occurs approximately half way between the balance bar and case, renders the connection between the balance bar and case soft in torsion and decreases the torsional spring energy in the links.

In summary, the present invention maintains dynamic balance despite changes in fluid density by altering relative spring rates rather than mass distribution. It does this by concentrating the structural spring in the vicinity of the end nodes. The dynamic structure is supported in the case by links along the flow tube/balance bar pivot axes. These links are rigid in translation in the direction of vibration but soft in torsion.

DESCRIPTION OF THE DRAWINGS

FIGS. 23, 24, 25, 26, 27 and 28 disclose details of a first and a second possible exemplary embodiment of the present invention.

DETAILED DESCRIPTION

Figure 1:
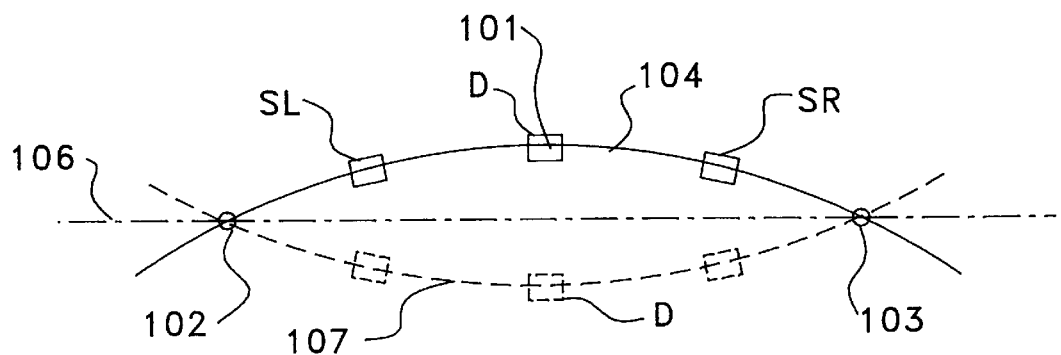
FIGS. 1, 2 and 3 disclose vibrational characteristics of a prior art straight tube Coriolis flowmeter.
Figure 2:
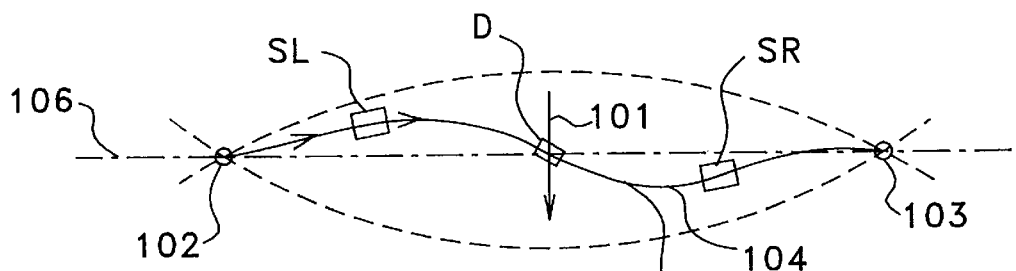

Description of FIGS. 1 and 2

FIG. 1 portrays a Coriolis flow tube 104 vibrated by driver D located at the center 101 of tube 104 and operating under a no flow conditions so as to create node locations 102 and 103. The flow tube 104 is associated with a left sensor SL and a right sensor SR. Dashed line 106 is the zero displacement axis of flow tube 104. Dashed line 107 is opposite the deflection extremity of flow tube 104. FIG. 2 portrays the same flowmeter operating under a flow condition.

In vibrating flow tube Coriolis flowmeters, the Coriolis force of the flowing fluid deforms the shape of the vibrating flow tube 104. This deformation, which is greatly exaggerated as element 108 in FIG. 2, causes different locations along flow tube 104 to vibrate with slightly different phases. Each point along the vibrating flow tube undergoes sinusoidal motion; but during material flow, the points do not reach their maximums displacements or zero displacements simultaneously. The center of a vibrating flow tube experiences no phase change with flow while locations toward the inlet end experience increasing amounts of phase lag and locations toward the outlet end of the flow tube experience increasing amounts of leading phase. The points having maximum phase lag and lead are thus at the inlet and outlet ends of the vibrating portion of the flow tube. These ends are defined by nodes, or locations of zero vibration amplitude.

End node 102 is assumed to be at the inlet of the flow tube 104 while end node 103 is positioned at the outlet of flow tube 104. The portion of the flow tube to the left of its center 101 has a phase lag in that each point on this portion of flow tube 104 passes through its zero displacement axis 106 after the corresponding point of the right side of flow tube 104 passes through zero displacement axis 106.

The difference in phase between two locations on flow tube 104 is the means by which flow rate is determined. Velocity (or displacement or acceleration) sensors SL and SR are located at two locations along flow tube 104. The time delay (phase difference divided by flow tube frequency) between the sensors' output sine waves is directly proportional to the mass flow rate through flow tube 104. The phase difference and time delay between the sensors' output signals would be greatest at the end nodes 102 and 103. Locating velocity sensors SL and SR at nodes 102 and 103 would theoretically produce the most sensitive meter. However, there is no vibration amplitude to be sensed at nodes 102 and 103 since they do not move. Thus, a compromise position for the velocity sensors SL and SR is chosen that has enough separation from nodes 102 and 103 for a reasonable sensitivity (phase difference) and enough signal amplitude to provide a readily detected sine wave. These compromise positions are usually about half way between end nodes 102 and 103 and the centrally located driver D.

A change in the locations of the end nodes 102 and 103 with respect to the location of the fixed velocity sensors SL and SR changes meter sensitivity to flow. As the nodes are moved in towards the velocity sensors, or outwards away from the velocity sensors, the phase delay and thus the meter sensitivity changes. The locations of the flow tube end nodes 102 and 103 are determined by the structural design of the meter but the node positions can be altered by meter imbalance.

Figure 3:
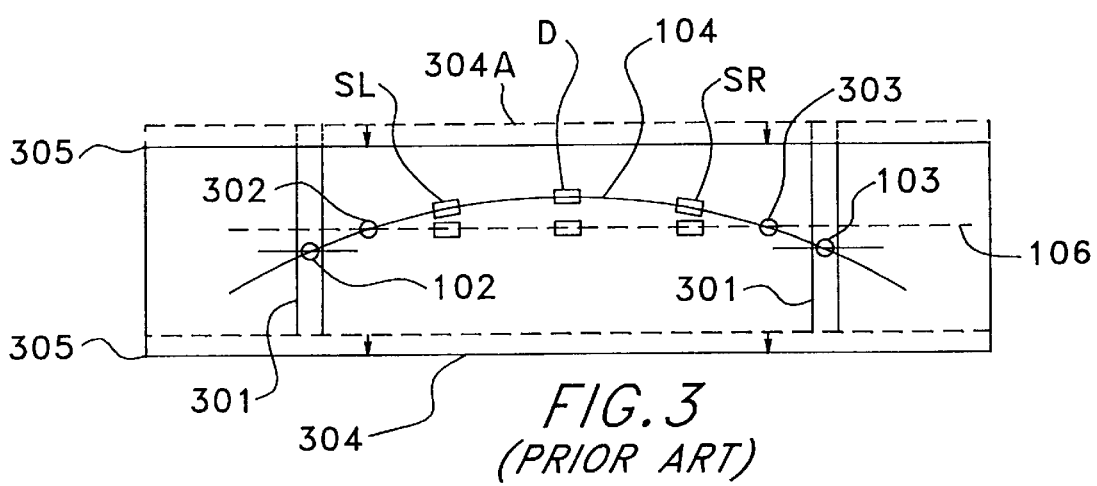

Description of FIG. 3

FIG. 3 discloses flow tube 104 connected by end plates 301 to a surrounding case 304. Flow tube 104 is vibrating and has a certain amplitude. If case 304 is stationary, the nodes reside at the desired nodal locations 102 and 103. The structure is then said to be dynamically balanced. However, in FIG. 3, case 304 is also vibrating at the same frequency, but 180 degrees out of phase with respect to flow tube 104 (a common situation for an unbalanced flow tube). The dashed lines 106 and 304A represent the undeflected flow tube and case position. The desired nodal locations 102 and 103 at plates 301 are not the true nodes because of the case vibration. The true nodes are at the locations 302 and 303 on the flow tube 104 where the flow tube 104 vibration amplitude relative to case 304 is equal and opposite to case vibration amplitude. Thus, the total vibration amplitude at nodes 302 and 303 is zero. It can be seen that the nodal locations 302 and 303 on FIG. 3 have moved inwards on flow tube 104 from plates 301 due to the case vibrating out of phase with flow tube 104. Shifts in nodal location with respect to fixed position sensors SL and SR alter the flowmeter's sensitivity to flow and are undesirable.

In order to keep nodes 102 and 103 at their design points within end plates 301, it is necessary to keep case 304 from vibrating. This is easily done for a single (flowing) material density by counterbalancing the spring mass system of flow tube 104 with another spring mass system of the same resonant frequency.

Figure 4:
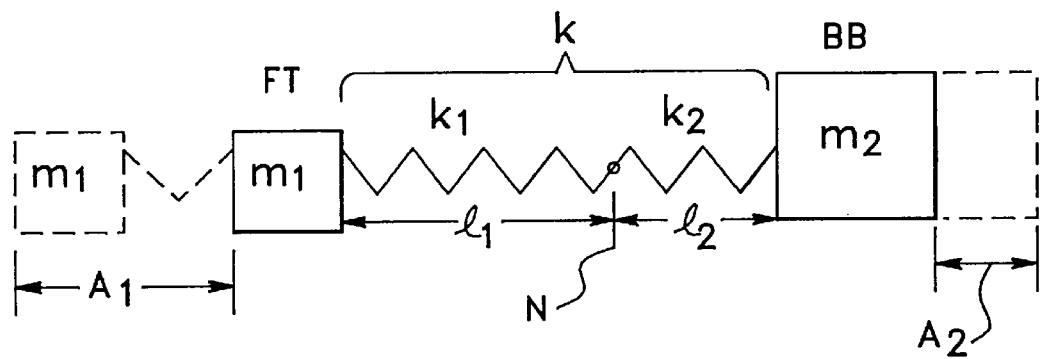
FIGS. 4, 5, 6, 7 and 8 disclose the vibrational characteristics of lumped spring/mass structures.
Figure 5:
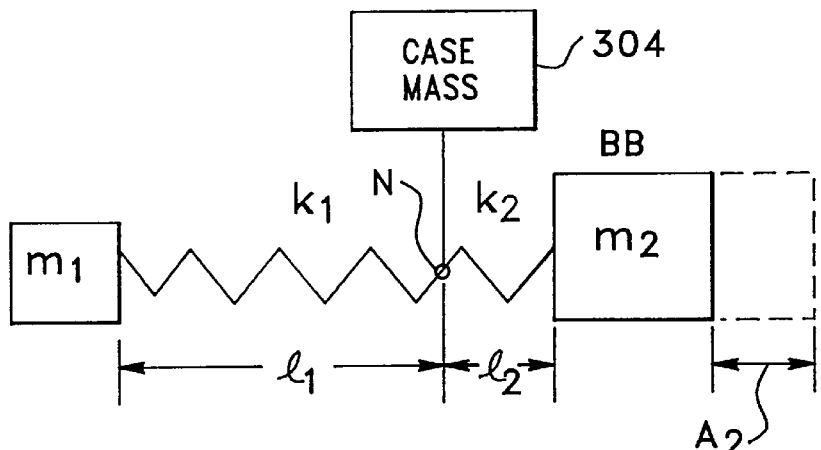
Figure 6:
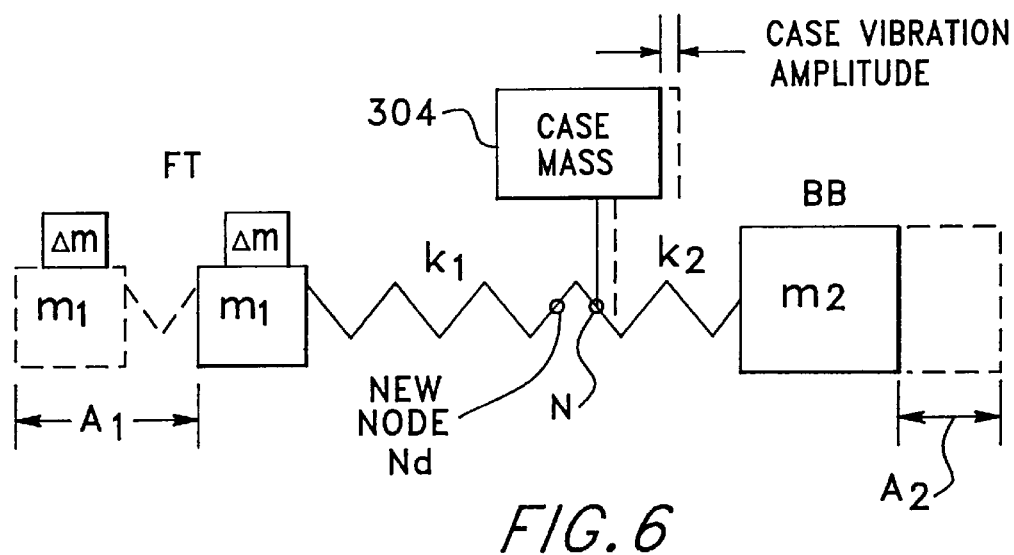

Description of FIGS. 4, 5, and 6

The simplified spring mass system of FIG. 4 illustrates how counterbalancing works. Two lumped masses, $m_1$ and $m_2$, are connected by an ideal massless spring with a spring rate k. When masses $m_1$ and $m_2$ are pulled apart and released, they vibrate 180 degrees out of phase with each other at the same resonant frequency.

The law of conservation of momentum requires that mass times velocity in one direction is equal to the mass times velocity in the opposite direction, or $m_1V_1=m_2V_2$. Since vibration velocity is proportional to vibration amplitude, $m_1A_1=m_2A_2$ where $A_1$ and $A_2$ are vibration amplitudes. In simple terms, large mass $m_2$ must have a small vibrating amplitude compared to $m_1$. It also follows that there is a node N having zero movement on the spring. The location of the node at N divides the spring into two lengths having lengths $l_1/l_2=A_1/A_2$. Since the node N position is fixed, each spring part behaves as though as it were fastened to a wall rather than the other part of the spring.

The two halves of a two body vibrating system (on either side of spring node N) must have the same resonant frequency. Resonant frequency is equal to the square root of (stiffness/mass) or:

$$fr = \sqrt{\frac{k}{m}} \qquad \text{Equ. 1}$$

The two halves of the system of FIG. 4 must have the same stiffness to mass ratio since:

$$fr = \sqrt{\frac{k_1}{m_1}} = \sqrt{\frac{k_2}{m_2}} \qquad \text{Equ. 2}$$

It is also possible to determine that the stiffness to mass ratio must be constant based on the relationships between spring stiffness, length, and vibration amplitude. The spring of FIG. 4 is divided into two springs $k_1$ and $k_2$ by node N. The stiffness k of a spring is inversely proportional to its length, or $k_1/k_2=l_2/l_1$. Since $l_1/l_2=A_1/A_2$ and $m_1A_1=m_2A_2$, by substitution, we find that $k_1/m_1=k_2/m_2$.

If the spring mass system of FIG. 4 represents a traditionally balanced single flow tube Coriolis flowmeter, then $m_1$ represents the mass of flow tube 104, and $m_2$ the mass of the balance bar. Case 304 is connected to them at node N as in FIG. 5. Since node N is motionless, case 304 does not vibrate. In FIG. 6 an additional mass Δm has been added to $m_1$ to represent a fluid of higher density in flow tube $m_1$. Conservation of momentum must still apply, so the nodal location N moves toward $m_1$ to a position Nd comprising a new nodal location. This causes case 304, which is connected at N (which is no longer a node), to vibrate with $m_2$ with a vibration amplitude such that the sum of the momentums on each side of new node Nd is zero. Since the case is generally a much larger mass than either $m_1$ or $m_2$, the node does not have to move very far from N to Nd in FIG. 6 to vibrate case 304 with sufficient amplitude to conserve momentum. If mass were removed from $m_1$ rather than added to it, then the node would move from N to the right and case 304 would vibrate with $m_1$ rater than $m_2$.

In summary, in prior art single tube flowmeters, a change in mass of the flow tube 104 ($m_1$) results in enough change in the nodal location to cause the case mass to vibrate in phase with either $m_1$ or $m_2$ with enough vibration amplitude to conserve momentum. Since the case mass is large, the change in nodal position is small, the case vibration amplitude is small, and the meter sensitivity change with fluid density is small. However, the sensitivity change with fluid density is sufficiently large to degrade the accuracy required of a Coriolis flowmeter in some applications.

The present invention significantly improves upon the traditional flow tube balancing method by altering the stiffness of $k_1$ and $k_2$ rather than involving the case mass in balancing. In the traditional approach the effective spring of the flowmeter structure is distributed throughout the flow tube, balance tube, and the connecting structure such as brace bars 301. The movement of the end nodes' 102 and 103 location with a material density change in flow tube 104 is very small compared to the effective "spring" length; thus the nodal movements have very little impact on altering the effective spring rates $k_1$ and $k_2$ and are unable to achieve a dynamic balance in the structure without involving case mass. Recall that:

$$\frac{k_1}{m_1} = \frac{k_2}{m_2} \qquad \text{Equ. 3}$$

In the prior art, the primary means of conserving momentum is a transfer of the case mass 304 to move with the light member. Thus, equality is achieved when:

$$\frac{k_1}{m + \Delta m} = \frac{k_2}{m_2 + m_{case}} \qquad \text{Equ. 4}$$

Figure 7:
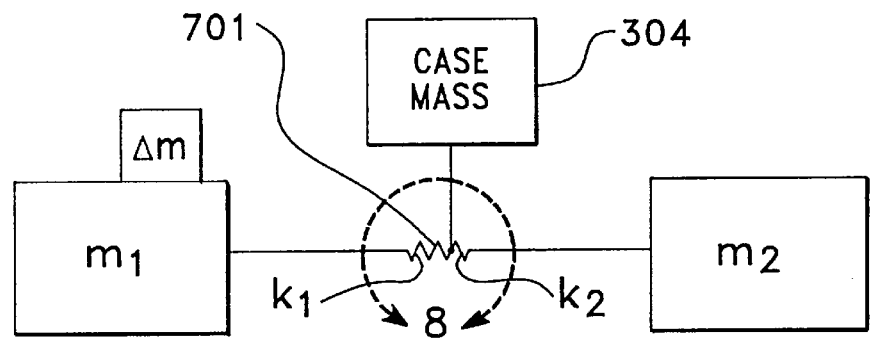
Figure 8:
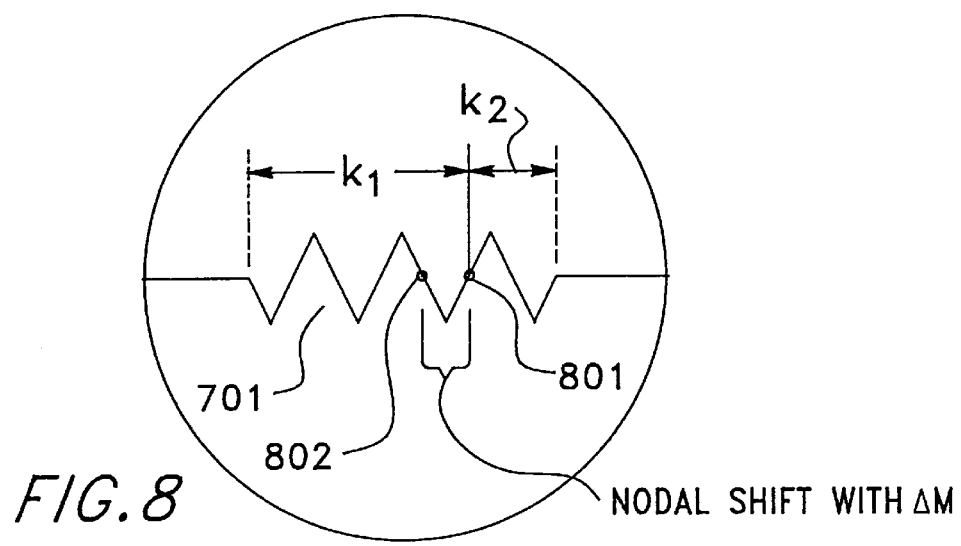

Description of FIGS. 7 and 8

As shown in FIGS. 7 and 8, the present invention employs an extremely short spring 701 in the nodal area so that any movement in nodal position due to dynamic unbalance causes a relatively large change in the individual spring rates, $k_1$ and $k_2$. By altering spring rates, dynamic balance is maintained and the required mass transfer and the length of the nodal position shift is reduced. This reduces the case vibration and the change in meter sensitivity with fluid density.

FIG. 8 is an enlargement of the spring region of FIG. 7. It shows how the node shifts the short distance from location 801 to 802 to regain dynamic balance after mass Δm has been added to $m_1$. It also shows how this short distance is significant compared to the short spring length. Spring $k_1$ is shortened and stiffened while spring $k_2$ is lengthened and softened enabling meter balance with much less nodal shift and case shaking than if the spring were extended throughout the structure as in prior art. The difference between the conventional balancing approach and that of the present invention is illustrated by the way the resonant frequency equality between the flowmeter elements is maintained despite a change in one of the masses.

Recall from equation 2 that:

$$fr = \sqrt{\frac{k_1}{m_1}} = \sqrt{\frac{k_2}{m_2}}$$

When mass Δm is added to the flow tube mass $m_1$, such as by a change in fluid density, the prior art balancing method maintains the equality by adding case mass to the balance bar mass. The case vibrates under this condition.

$$\sqrt{\frac{k_1}{m_1 + \Delta m}} = \sqrt{\frac{k_2}{m_2 + m_{case}}} \qquad \text{Equ. 5}$$

This equation requires the case mass to be directly involved in the balancing.

The present invention maintains the equality of the stiffness to mass ratio by altering the spring rates, $k_1$ and $k_2$ of the flowmeter structure in response to the added mass, Δm:

$$\sqrt{\frac{k_1 + \Delta k_1}{m_1 + \Delta m}} = \sqrt{\frac{k_2 - \Delta k_2}{m_2}} \qquad \text{Equ. 6}$$

This equation does not involve the case mass and instead, alters the stiffness of $k_1$ and $k_2$ to achieve balancing. This case does not vibrate significantly since it is not involved in achieving a dynamic balance.

Figure 9:
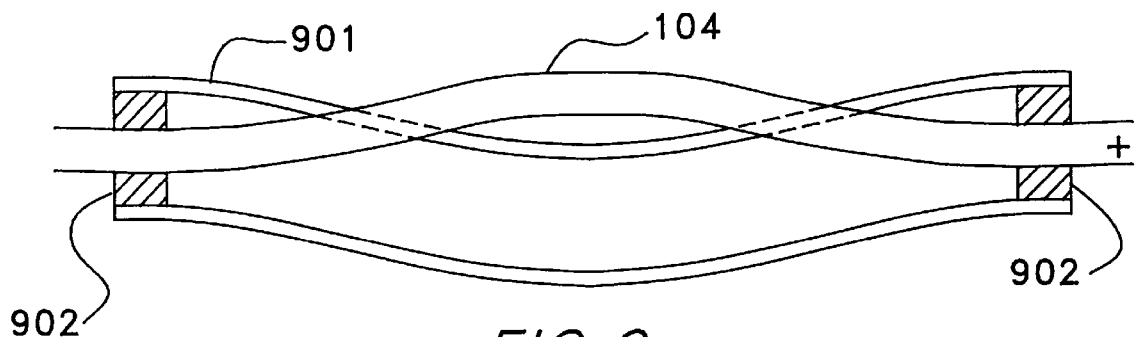
FIG. 9 discloses a prior art Coriolis flowmeter.

Description of FIG. 9

FIG. 9 shows a typical prior art flowmeter flow tube and balance bar in its deformed state. In prior art, flow tube 104 and balance bar 902 are essentially uniformly stiff along their lengths and deform throughout their lengths. The spring of the system is spread throughout the structure. The term "spring" in this context refers to a volume of metal that deforms elastically in response to applied force. It stores energy as it is deformed and returns energy back to the system as it relaxes. The whole structure of FIG. 9 thus acts as a large spring. Nodal location shift, because it is very small in relation to the great spring length, does very little to alter the effective length and thus the effective spring stiffness of either the flow tube or the balance bar.

Figure 10:
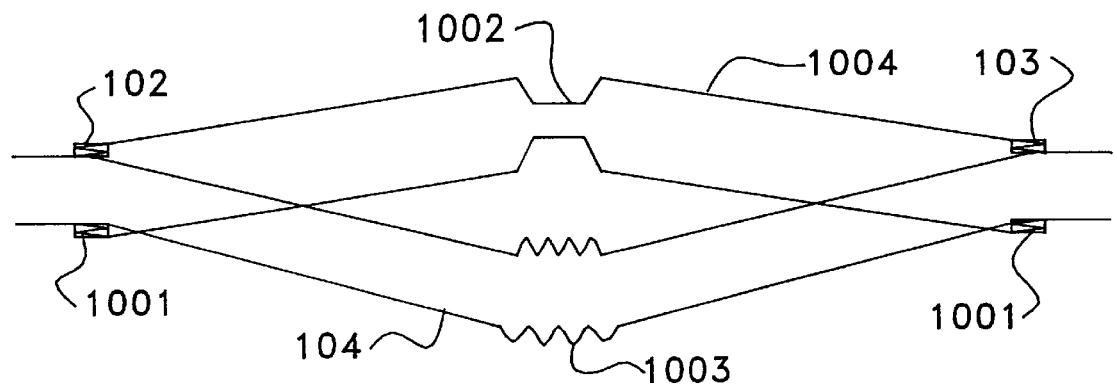
FIG. 10 discloses the balance bar and flow tube spring structure of the present invention.

Description of FIG. 10

One of the design details of the present invention which enables spring rate balancing of a flowmeter, rather than mass balancing, is the localization of the spring proximate the end nodes of the flow tube. FIG. 10 discloses a conceptual embodiment of structure comprising the present invention. This structure localizes the spring function of the flowmeter portrayed in FIG. 10 in the vicinity of N nodes 102 and 103 of flow tube 104 and balance bar 1004 by creating center portions 1002 and 1003 of both flow tube 104 and balance bar 1004 that are very easy to bend.

This is done by the use of a less stiff material in the centers of flow tube 104 and balance bar 1004 such as rubber, or a less stiff geometry. This center portion comprises bellows 1003 in the flow tube 104 and a necked down region 1002 in balance bar 1004. These "soft" center areas concentrate the bending of elements 104 and 1004 in this central region. Because the spring rate is so low in these central regions, the spring energy is concentrated in the regions where flow tube 104 is connected to balance bar 1004. This area is the brace bar 1001 in FIG. 10. The straight portions of flow tube 104 and balance bar 1004 are stiff and free to move, however, they do not form effective springs since their soft center portions remove the bending moments from these stiff elements. If the balance bar and flow tube central regions 1002 and 1003 are sufficiently flexible, then their stiffness is so low that it becomes insignificant in the dynamics of the spring mass system. The total spring, k, is then concentrated and becomes equal to that of brace bar 1001.

Figure 11:
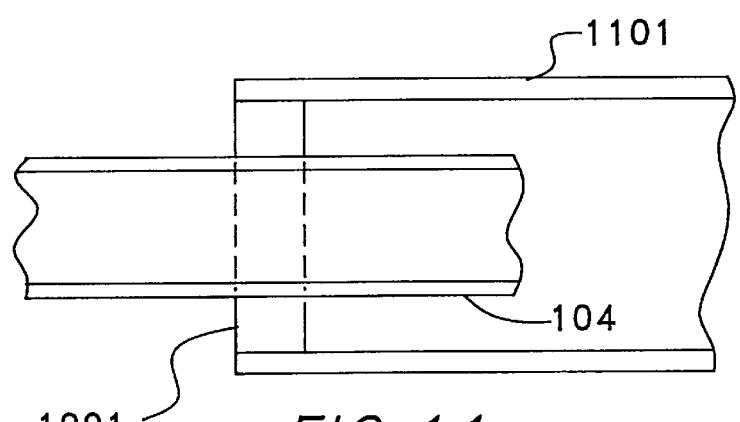
FIGS. 11, 12, 13, 14, 15 and 16 discloses further details of the brace bar, balance bar and flow tube structure of the present invention.
Figure 12:
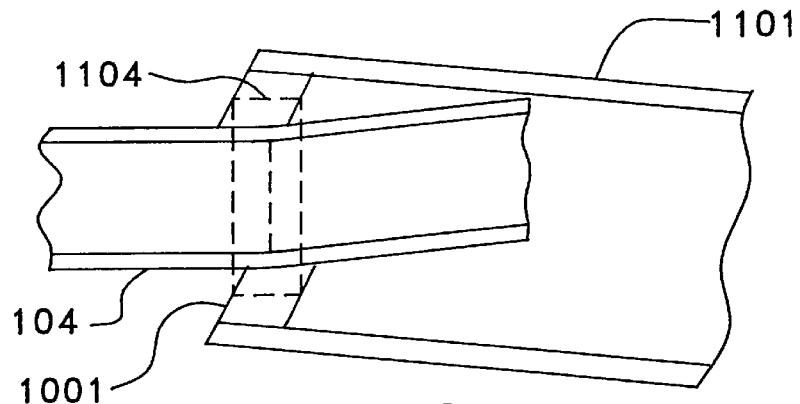
Figure 13:
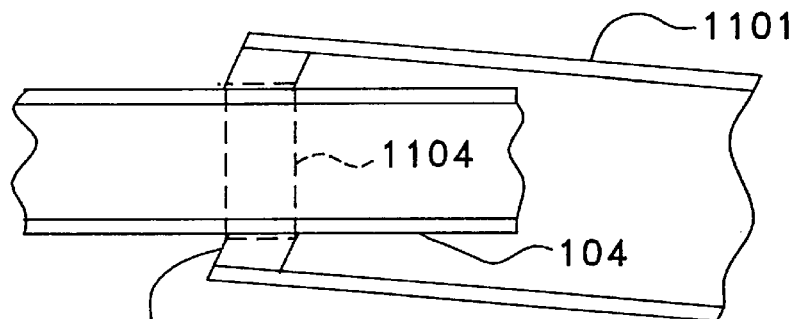

FIG. 11 shows a section view of the brace bar 1001 on one end of a flowmeter having flow tube 104 and balance bar 1101 (comparable to 1004). FIG. 12 shows (greatly exaggerated) the deformation in brace bar 1001 that results when flow tube 104 and balance bar 1101 have approximately equal vibrational amplitudes. The node (area experiencing no motion) is in this case a cylindrical surface 1104 (dashed lines) approximately half way between flow tube 104 wall and balance bar 1101 wall. FIG. 13 shows the deformation that results when balance bar 1101 has a much larger vibration amplitude than flow tube 104. This situation results from a very high density fluid in flow tube 104. The dense fluid tends to lower the frequency and vibration amplitude of flow tube 104 (remember conservation of momentum). It can be seen that the nodal cylinder 1104 has moved very close to flow tube 104 due to the flow tube's decreased amplitude. This causes the flow tube's effective spring to become short and stiff and decreases the drop in the flow tube's resonant frequency. Simultaneously the balance bar effective spring has lengthened and softened. This causes the balance bar's resonant frequency to also drop. When properly designed, the shift in spring rate Δk within brace bar 1001 is just sufficient to balance the extra mass of the high density fluid in the flow tube. The resonant frequencies then drop equal amounts and remain equal without involving the case mass. All this is desirable because case vibration amplitude changes meter sensitivity.

Until now it has been assumed that the relative vibrational amplitude of flow tube 104 compared with the vibrational amplitude of balance bar 1101 decreases with a dense fluid and increases with a light fluid. With the balance bar and the flow tube having equal resonant frequencies due to the spring rate shift, this assumption is justified. If the balance bar is visualized as a dynamic balancer fastened to the flow tube at the desired end nodes, it is readily apparent that any movement at the desired nodal positions within brace bar 1001 pumps energy into the dynamic balancer formed by balance bar 1101 and increases its amplitude until the reaction force from the dynamic balancer suppresses the nodal motion. If mass is put onto flow tube 104, the dynamic balancer lowers its resonant frequency to maintain frequency equality and raises its amplitude until the position of nodal cylinder 1104 is stationary. If mass is removed from flow tube 104, the dynamic balancer raises its resonant frequency and lowers its amplitude just the right amount.

Description of FIGS. 14–21, 29 and 30

Figure 14:
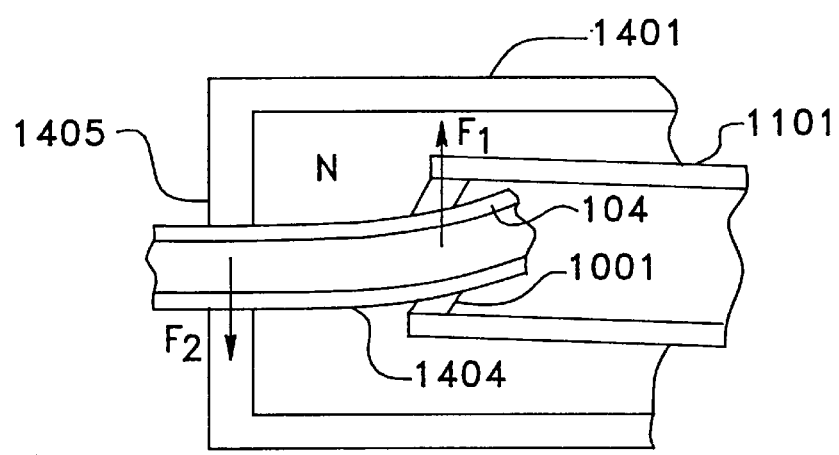
Figure 15:
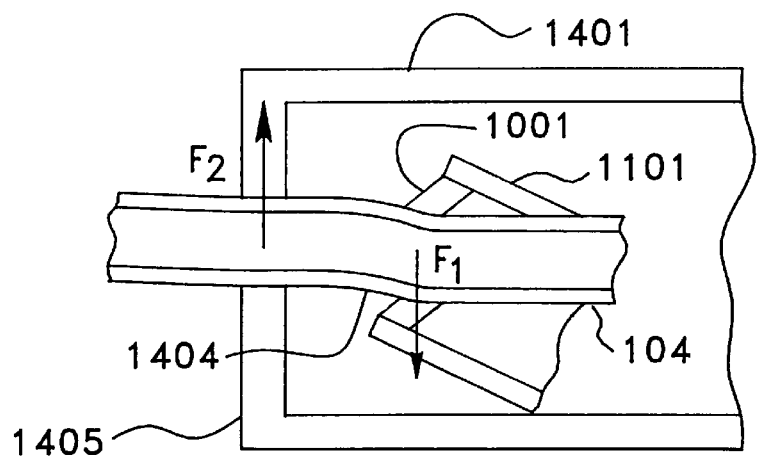

The present invention maintains dynamic balance by altering the relative spring stiffness rather than by transferring masses between the vibrating flow tube, balance bar and case members. It is able to accomplish this by concentrating the spring function locally around the fixed nodal area 1104 within brace bar 1001. FIGS. 11, 12 and 13 show how this is accomplished so that flowmeter sensitivity is not affected. However, they ignore, for purposes of simplicity, a complicating factor illustrated by FIGS. 14 and 15. FIGS. 14 and 15 disclose a flowmeter case 1401 having an end portion 1405 of case 1401 which contains balance bar 1101, flow tube 104 and brace bar 1001. Flow tube 104 and the balance bar 1101 are interconnected at the end of balance bar 1101 by brace bar 1001. In FIG. 14, the flow tube 104 vibrational amplitude is much larger than the balance bar 1101 amplitude. In FIG. 15, the balance bar 1101 amplitude is much larger than the flow tube 104 amplitude. These situations would balance a meter having a light fluid (FIG. 14) and dense fluid (FIG. 15) respectively.

Figure 16:
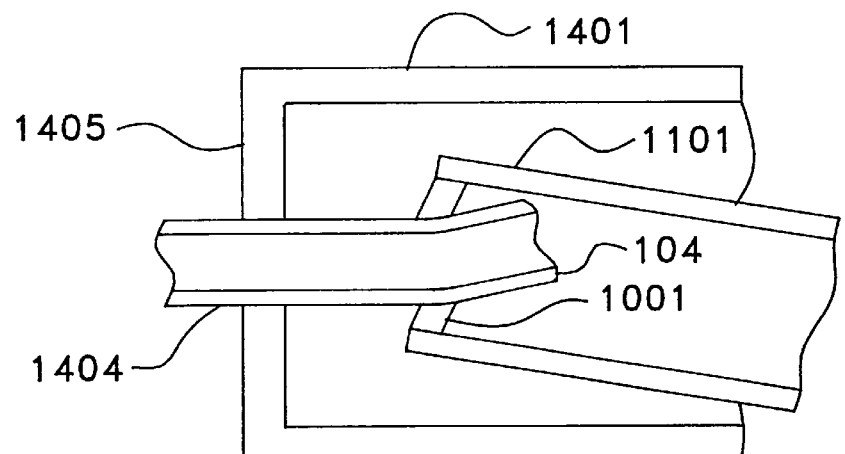
Figure 17:
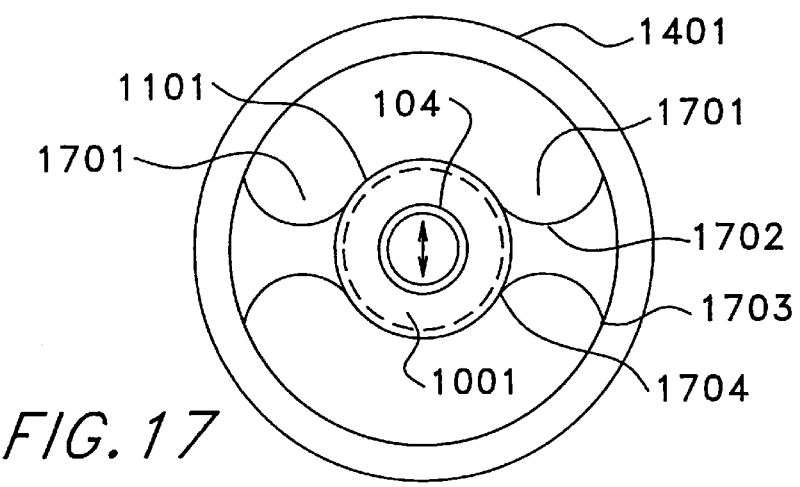
FIGS. 17, 18, 19, 20 and 21 disclose further details of the brace bar connecting links of the present invention.
Figure 18:
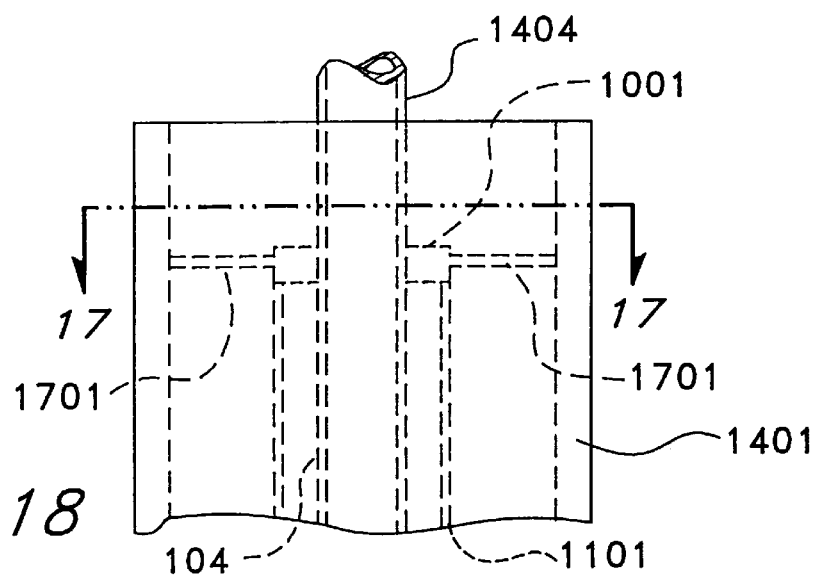
Figure 19:
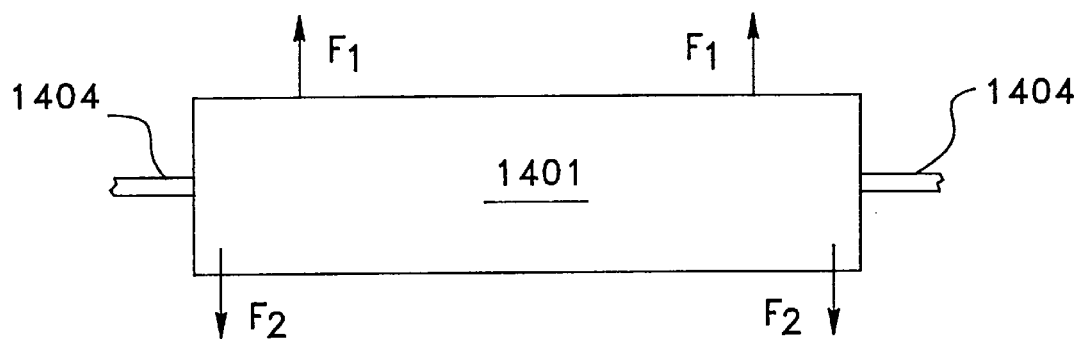
Figure 20:
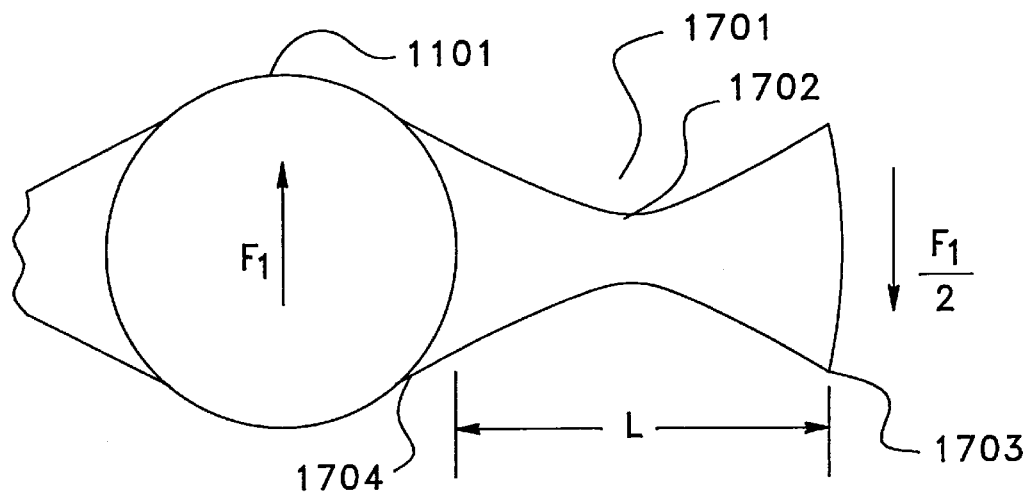
Figure 21:
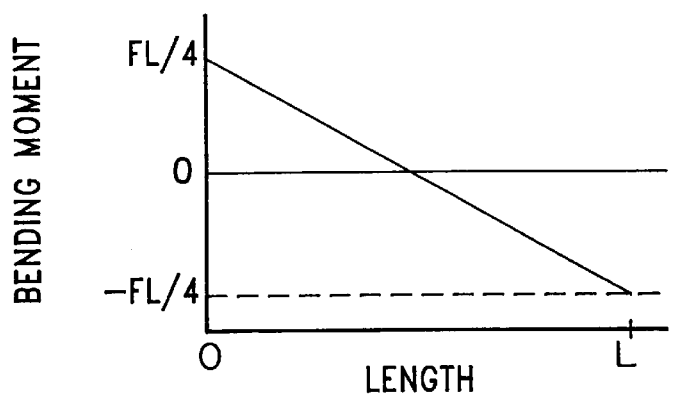

FIGS. 14 and 15 differ from FIGS. 11, 12 and 13 in that flow tube 104 is bending in the flow tube segment 1404 between brace bar 1001 and case end 1405 in response to the torque applied to flow tube 104 in brace bar 1001 region. The torque is the result of the relative vibrational amplitudes of flow tube 104 and balance bar 1101. The flowmeter can be designed so that for a given fluid density the torque applied by balance bar 1101 is equal and opposite to the torque applied by flow tube 104 (FIG. 16). However, as fluid density changes, the amplitude ratio between the flow tube 104 and balance bar 1101 changes and the torque becomes unbalanced. This torque is resisted by the case connect links 1701 (FIG. 17) and case end 1405, where flow tube segment 1404 penetrates it, resulting in equal and opposite forces $F_1$ and $F_2$. It can now be appreciated why case connect links 1701 must be rigid in translation in the direction of vibration. Case connect links 1701 must resist force $F_1$ lest the desired nodal locations be forced to translate by $F_1$ and the entire structure becomes unbalanced. Case end 1405 and case connect links 1701 transfer the forces to case 1401 which is extremely rigid and where the forces cancel each other resulting in no shaking forces on the case. When both ends of case 1401 are taken into consideration (FIG. 19) the moments on case 1401 also cancel.

Case connect links 1701 have specific design criteria imposed upon them. They must be rigid enough that they prevent significant relative motion between the nodal region of brace bar 1001 and case 1401. Simultaneously they must be sufficiently flexible in torsion so that the balance bar 1101 ends are free to rotate without storing significant spring energy in the connecting links 1701. If spring energy were stored in case connect links 1701, it would be external to the nodal area and degrade the self balancing performance of the meter. One possible preferred design of the connecting links is butterfly or hour glass shaped as in FIGS. 17 and 20. The narrow central section 1702 allows for a flexibility in torsion but not translation. The wide ends 1703 and 1704 provide sufficient stiffness to resist translational forces. The central section 1702 does not have to be wide to resist the translational forces because the bending moments that accompany the translation forces on the link go to zero in the center of the link as is shown in the bending moment diagram of FIG. 21.

Figure 29:
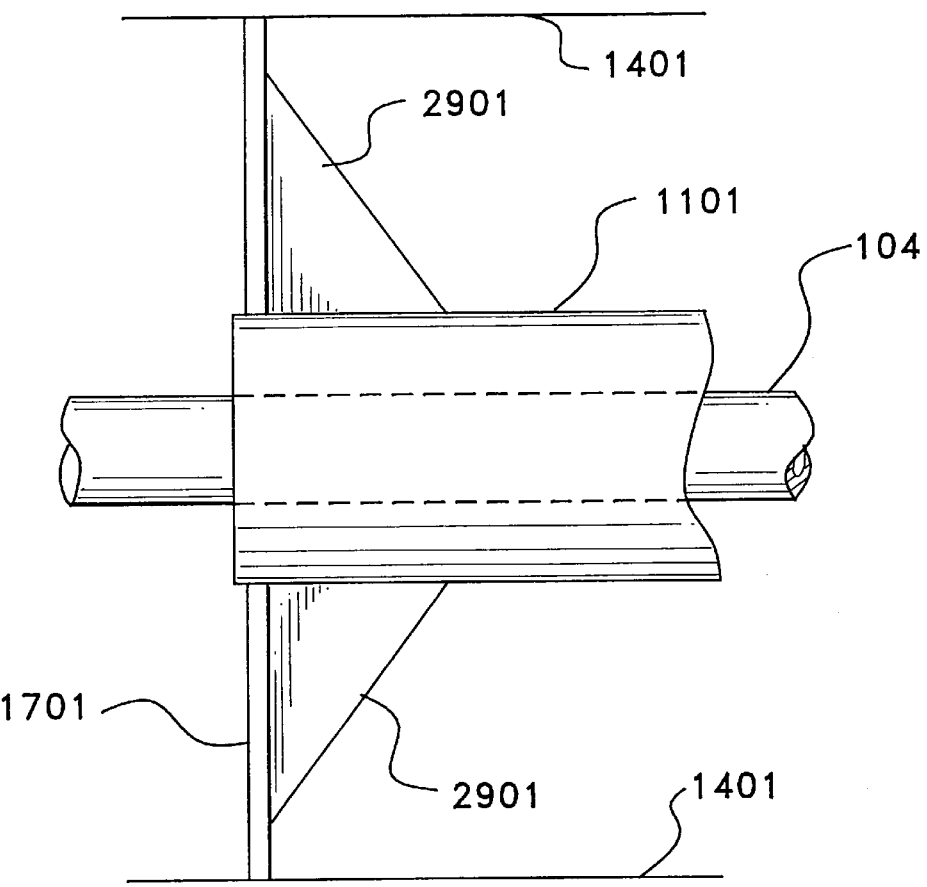
FIGS. 29 and 30 disclose an alternative embodiment of the brace bar connecting links of FIGS. 18–21.
Figure 30:
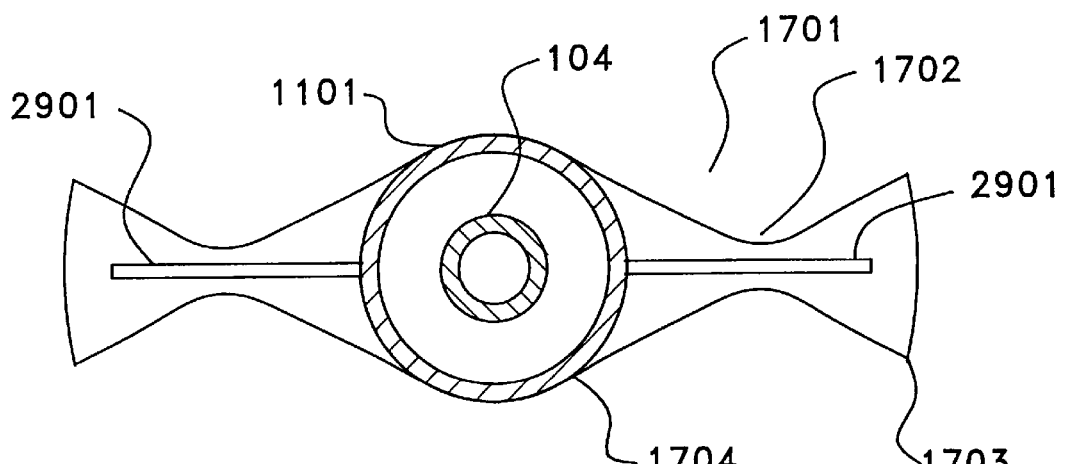

Case connect links 1701 can also be used to solve another design problem. Flow tube 104 and balance bar 1101 are driven to vibrate in a resonant frequency opposed to each other. They are driven to vibrate in a direction that, along with the tube axis defines a plane called the drive plane. The flow tube and the balance bar also have a vibration mode in which they vibrate in a direction perpendicular to the drive plane. Due to the axial symmetry of the flow tube, brace bar, and balance bar, it is likely that the frequency of the perpendicular vibration mode is very near to the drive frequency. This narrow frequency separation can cause measurement problems and should be avoided. A way to increase the frequency separation between the drive mode and the perpendicular mode is to put thin metal gussets between the case connect links and balance bar as is shown in FIG. 29 and FIG. 30. Gussets 2901 are fastened to case connect links 1701 and balance bar 1101. This orientation stiffens case connect links to the bending deflection required in the perpendicular mode. It thereby stiffens the balance bar mounting and raises the frequency in the perpendicular mode. Because the gussets are thin, they do not significantly increase the torsional rigidity of the case connect links or raise the frequency of the drive mode. Furthermore, they do not impact the stiffness of the case connect links in translation in the drive direction.

The torque applied to tube stub 1404 by forces $F_1$ and $F_2$ causes one other problem in that each tube stub bends in response to the torque. This flexing of flow tube stub 1404 external to brace bar 1103 is a significant extension of the effective spring structure of the flow tube away from the nodal area. As has been previously discussed, it is desirable to concentrate the spring function of the meter in the vicinity of the node. This extension of the spring structure degrades the spring balancing of the meter.

Description of FIGS. 22–28

Figure 22:
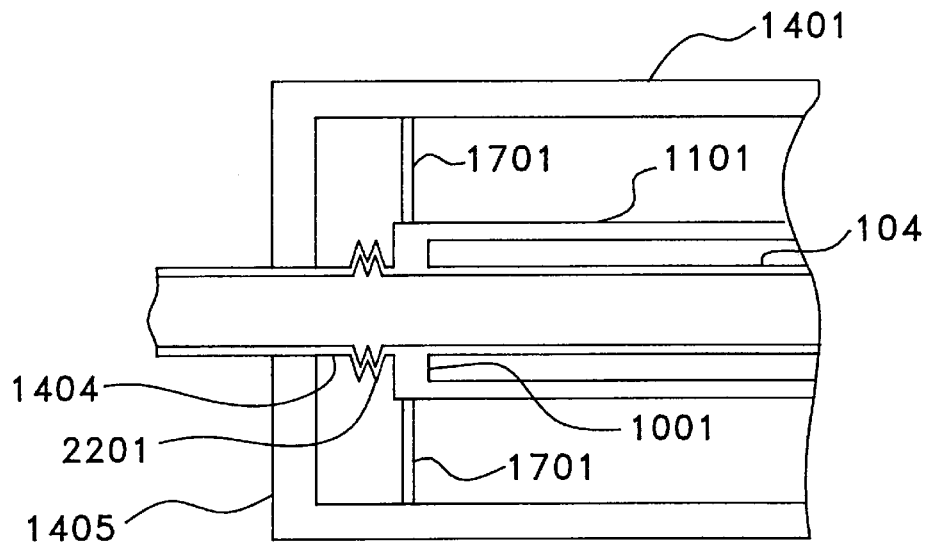
FIG. 22 discloses flow stub extension stub of the present invention.

The spring energy stored in tube stub 1404 is reduced by reducing the spring rate of flow tube stub 1404 by the provision of a softer material or a softer geometry such as bellows 2201 on FIG. 22. Bellows 2201 reduce the spring energy in tube stub 1404 so as to further concentrate it in brace bar 1001 regions. Bellows 2201 also greatly reduces the torque forces applied to case 1401 by the tube stubs 1404. They reduce these forces by allowing the brace bar region 1001 to pivot freely. From a self balancing perspective, the design of FIG. 22 and, with the case removed, FIG. 23 is a preferred embodiment of the present invention.

Figure 23:
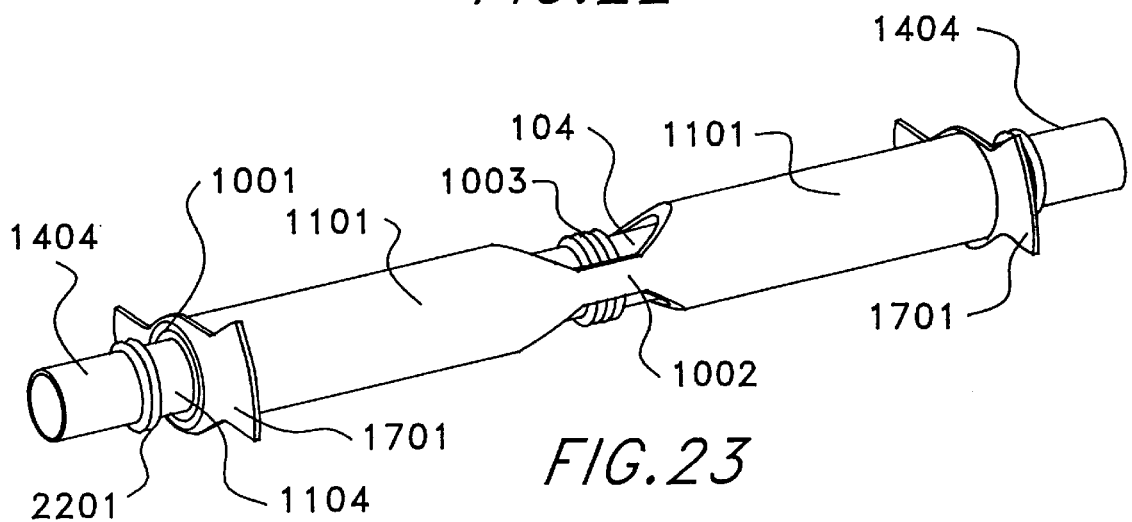

FIG. 23 shows a flowmeter similar to that of FIG. 22 but without case 1401 being shown. In particular, the flowmeter structure shown on FIG. 23 comprises flow tube 104 having a bellows 1003 in its center section and bellows 2201 in its tube stub 1404 sections. Flow tube 104 is surrounded by balance bar 1101 having a flexible center portion due to the reduced section 1002 interconnecting the left and right portions of balance bar 1101. The structure of FIG. 23 further includes case connection links 1701. The structure of FIG. 23 thus, is preferred in applications in which dynamic balance is the primary criteria. Dynamic balance is achieved by the structure of FIG. 23 since it concentrates the spring structure of the flow tube 104 and balance bar 1101 in brace bars 1001 proximate the end nodes.

In some applications bellows may negate some of the features that make a single straight flow tube flowmeter desirable. Bellows are difficult to clean internally. This makes bellows unacceptable in food applications, for instance, where it is necessary that the entire internal surface of the flow tube be cleanable and inspectible.

Figure 24:
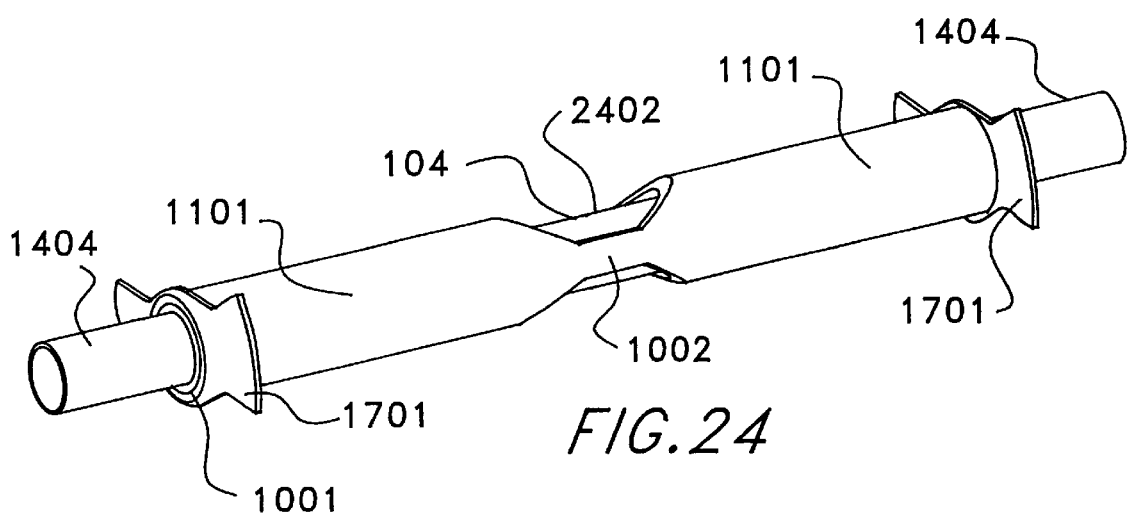

In cases where it is desirable to have flow tube 104 of a continuous uniform diameter and material, the flow tube's 104 central region and tube stub 1404 regions are not made soft in bending. It is still advantageous to make the central region 1002 of balance bar 1101 soft in bending and to use case connect links 1701 at the brace bars 1001. FIG. 24 is similar to FIG. 23 except that flow tube 104 is devoid of the bellows 2201 and 1003 of FIG. 23. The embodiment of FIG. 24 would be best preferred in applications where interior of flow tube 104 must be smooth and continuous. Thus, flow tube 104 of FIG. 24 does not have the flexibility afforded by the bellows 2201 and 1003 of FIG. 23.

The flowmeter of FIG. 24 is balanced so that the node is still in the brace bar 1001 region. Furthermore, the balance bar 1101 spring is still concentrated in brace bar 1001 proximate the node as in FIG. 23. On the flow tube 104 side of the node, the brace bar 104 portion of the flow tube spring is now in series with a relatively soft and distributed spring (the bending flow tube). When additional mass is placed on the flow tube, the nodal location moves toward the flow tube and significantly softens the balance bar 1101 spring as before described for FIG. 13.

The net flow tube spring, however, consists of the soft flow tube spring and a portion of the stiff brace bar 1001 spring in series. Springs in series add rates like resisters in parallel; the soft one (or small resistor) dominates.

$$k_{net}=k_1 k_2/(k_1+k_2)$$

Thus, a 100 pound per inch spring in series with a 10 pound per inch spring results in a net spring rate of 9.1 pounds per inch. If the stiffer spring were changed to 130 pounds per inch as might occur with nodal movement, the net series result would be a spring rate of 9.3 pounds per inch. Thus a 30% change in the stiffness of the stiff spring is seen to produce only a 2% change in the stiffness of the combined springs. The net flow tube 104 spring rate is thus dominated by the soft flow tube spring and the nodal position change in the brace bar 1001 spring has little effect on the rate of the net flow tube 104 spring.

Figure 25:
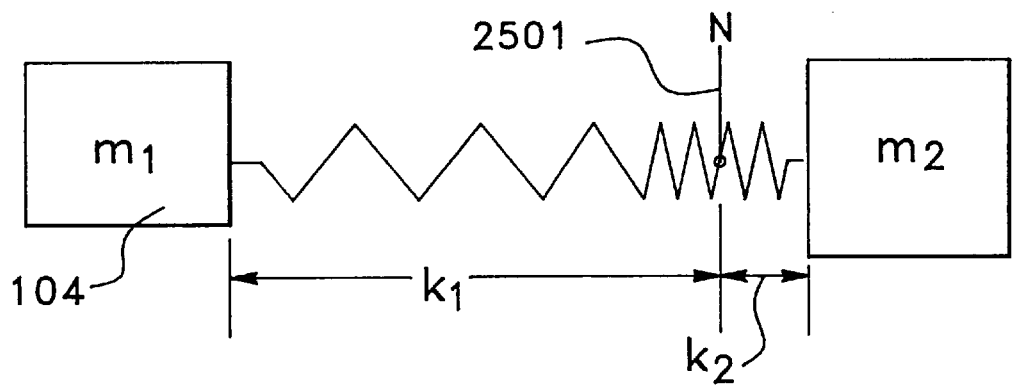
Figure 26:
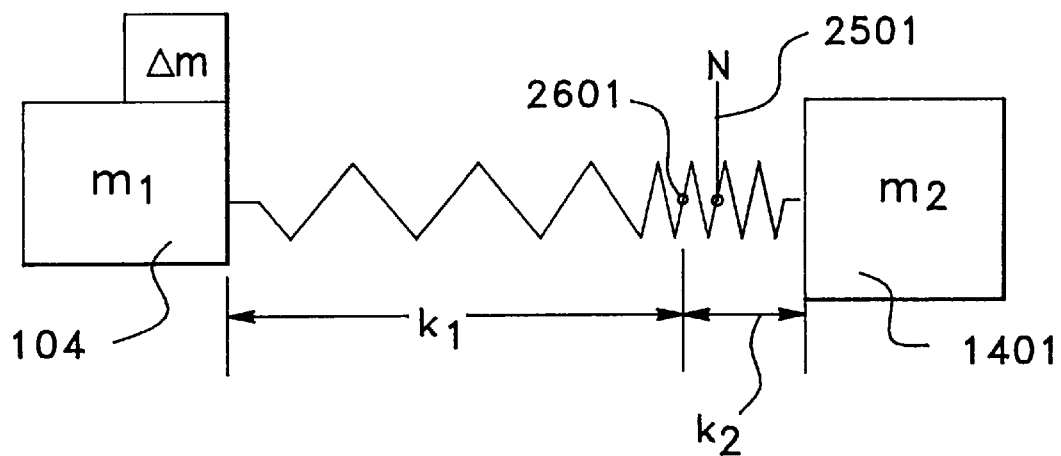

The spring function of flow tube 104 of FIG. 24 is illustrated conceptually on FIGS. 25 and 26. In FIG. 25, the flow tube 104 mass is represented by m1. The net flow tube spring is represented by k1 which is the series addition of the soft distributed flow tube 104 spring and the stiff portion of the brace bar 1001 to the left of node N. The larger balance bar 1101 mass is represented by the mass $m_2$ whose spring $k_2$ is concentrated in brace bar 1001. The node of this structure in the balanced condition is represented by node N at location 2501. In FIG. 26 mass Δm is added to the flow tube 104, such as when a heavy material is introduced into the flow tube, which causes the node N shift to the left to position 2601. This nodal shift causes a significant shift in the spring length and rate of k2, the balance bar 1101 spring. The flow tube 104 spring, however is made up of the soft distributed spring in the flow tube which does not change length in series with the short stiff spring of the brace bar on the flow tube side of the new nodal position. Even though the brace bar 1001 component is shortened significantly by the nodal movement, the distributed tube spring dominates the spring rate and the nodal shift makes little difference to the flow tube 104 overall spring stiffness. This geometry of FIG. 24 is thus a compromise with regard to maintaining balance with change in fluid density. The balance bar 1101 can change its spring rate but the flow tube 104 must change its mass by moving case 1401. The result is that the case does vibrate. However, the case movement is much less than prior art meters because the stiffness change in balance bar 1101 reduces the necessary mass transfer. This reduction in case vibration results in a smaller change in the nodal position and accuracy improvement in the flowmeter compared to the prior art.

The resonant frequency equation illustrates how this embodiment (without bellows in the flow tube) of the present invention still results in less case shaking than the prior art meters.

$$\sqrt{\frac{k_1}{m_1 + \Delta m}} = \sqrt{\frac{k_2 - \Delta k}{m_2 + m_{\text{case}}}}$$

This equation differs from the traditional approach (Equation 4) in the $\Delta k$ term. The presence of this term means that the case mass needs less involvement (vibration amplitude) in order to balance the equation and the meter.

FIGS. 27 and 28 disclose the structure of an entire Coriolis flowmeter embodying the present invention. FIG. 27 comprises the embodiment wherein the flow tube 104 does not include a bellows. The embodiment of FIG. 28 is similar to that of FIG. 27 except that the center portion of flow tube 104 and tube stubs 1404 areas include the bellows 2201 and 1003. Both embodiments show case end 1405 being connected by element 2702 to a flange 2701 by means of which the flowmeters of FIGS. 27 and 28 may be connected to a source of material such as a pipeline on its input and to a receiver of material on its output end.

Both embodiments of FIGS. 27 and 28 include a driver D in the mid portion of flow tube 104 and a left sensor SL and SR for detecting movements representative of Coriolis vibrations of the flow tube/balance bar structure which, in turn, is indicative of the material flow rate through the flowmeter.

It is to be expressly understood that the claimed invention is not to be limited to the description of the preferred embodiment but encompasses other modifications and alterations within the scope and spirit of the inventive concept. Thus, the term "material" as used herein is applicable to any substance that flows such as slurries, liquids and gasses including any combination thereof.

We claim:

1. A Coriolis flowmeter having an improved dynamic balance; said Coriolis flowmeter comprising:
   a flow tube and a balance bar oriented substantially parallel to each other;
   brace bar means connecting end portions of said balance bar to said flow tube;
   said flow tube having a spring function and a mass function;
   said balance bar having a spring function and a mass function;
   a reference mass;
   means for connecting said reference mass to an end of said balance bar and to said brace bar means;
   driver means for vibrating said balance bar and said flow tube transversely out of phase with respect to each other;
   said driver means being effective to establish a vibrational node in one of said brace bar means, said balance bar or said flow tube;
   said vibrational node acting to separate the effective spring function of said flow tube from the effective spring function of said balance bar;
   means for concentrating said effective spring function of said balance bar proximate said node;
   said means for concentrating being effective for changing the effective spring function of said balance bar in response to the presence of materials of different densities in said flow tube at different times;
   said means for concentrating being effective to maintain an improved dynamic balance of said Coriolis flowmeter.

2. The Coriolis flowmeter of claim 1 wherein said means for concentrating comprises a longitudinal mid portion of said balance bar having an increased flexibility with respect to the remainder of said balance bar.

3. The Coriolis flowmeter of claim 2 wherein said mid portion of said balance bar comprises a cut-away portion of a balance bar.

4. The Coriolis flowmeter of claim 1 further comprising:
   means for concentrating the effective spring function of said flow tube proximate said node;
   said means for concentrating the effective spring function of said flow tube being effective for changing the effective spring function of said flow tube in response the presence of materials of different densities in said flow tube at different times.

5. The Coriolis flowmeter of claim 4 wherein said means for concentrating the effective spring function of said flow tube comprises a longitudinal mid portion of said flow tube having increased flexibility with respect to the remainder of said flow tube.

6. The Coriolis flowmeter of claim 5 wherein said mid portion of said flow tube includes a bellows.

7. The Coriolis flowmeter of claim 1 wherein said reference mass comprises a case surrounding said balance bar and said flow tube and said brace bar means;
   said case having a longitudinal axis substantially parallel to said balance bar and said flow tube; and
   wherein said means for connecting comprises means for connecting said brace bar means to said case for preventing vibrational translations of said brace bar means with respect to said case.

8. The Coriolis flowmeter of claim 7 wherein said means for connecting said brace bar means to said case comprises links having a substantially flat surface oriented substantially perpendicular to a longitudinal axis of said balance bar and shaped to permit a rotation of said brace bar means with respect to said case while preventing vibrational translations of said brace bar means with respect to said case;
   said rotation of said brace bar means being about an axis perpendicular to said longitudinal axis of said balance bar and said flow tube and extending from said brace bar means to said case.

9. The Coriolis flowmeter of claim 8 wherein said substantially flat surface of each of said links is substantially hour glass shaped so as to define a first end and a narrow mid portion and a second end.

10. The Coriolis flowmeter of claim 9 wherein said first end of said link is connected to said brace bar means and said second end is connected to an inner wall portion of said case;
    said mid portion of said link having a low torsional spring rate so as to enable a rotation of said brace bar means with respect to said case;
    said mid portion being of sufficient strength to prevent vibrational translations of said brace bar means with respect to said case.

11. The Coriolis flowmeter of claim 10 wherein each of said links further includes a gusset member defining a planar surface connected between said balance bar and said links;

said gusset member having a first side affixed to a an outer surface of said balance bar with said first side being aligned substantially parallel to said longitudinal axis of said balance bar;

said gusset member having a second side substantially perpendicular to said first side and affixed to said substantially flat surface of said links;

said gusset member being effective to raise a lateral vibrational frequency of said balance bar while leaving substantially unaffected a drive vibrational frequency imparted to said balance bar in a direction perpendicular to said lateral vibrational frequency.

12. The Coriolis flowmeter of claim 10 further comprising driver means positioned proximate said balance bar and said flow tube for vibrating said flow tube and said balance bar out of phase with respect to each other perpendicular to their longitudinal axes; and sensor means positioned proximate said flow tube for detecting Coriolis perturbations of said flow tube generated by a flow of material through said flow tube while said flow tube is vibrated by said driver means;

said sensor means being effective in response to said detecting for generating output signals representing at least one characteristic of said flowing material.

13. The Coriolis flowmeter of claim 8 further including flow tube stubs for connecting an end portion of said flow tube proximate said brace bar means to ends of said case.

14. The Coriolis flowmeter of claim 13 wherein said flow tube stubs include bellows proximate said brace bar;

said bellows being effective to lower said spring function of said flow tube stubs to isolate said brace bar means dynamically from said case ends.

15. A dynamically balanced Coriolis flowmeter comprising:

a flow tube and a balance bar oriented substantially parallel to each other;

said flow tube having a spring function and a mass function;

said balance bar having a spring function and a mass function;

brace bar means oriented substantially perpendicular to said balance bar and to said flow tube and connecting end portions of said balance bar to said flow tube;

an elongated case surrounding said balance bar and said flow tube and said brace bar means;

said case having a longitudinal axis substantially parallel to said balance bar and said flow tube;

driver means for vibrating said balance bar and said flow tube transversely out of phase with respect to each other;

said driver means being effective to establish a vibrational node in one of said brace bar means, said balance bar, or said flow tube;

said vibrational node acting to separate the effective spring function of said flow tube from the effective spring function of said balance bar;

links for connecting said brace bar means to an inner wall portion of said case for preventing vibrational translations of said brace bar means with respect to said case during an out of phase vibration of said balance bar and said flow tube with respect to each other;

said links being hour glass shaped to permit a rotation of said brace bar means with respect to said case while preventing said vibrational translations of said brace bar means with respect to said case;

said rotation of said brace bar means being about an axis perpendicular to a longitudinal axis of said balance bar and said case;

means including a cut out in a center portion of said balance bar for concentrating the effective spring function of said balance bar proximate said node;

means including bellows comprising a mid portion of said flow tube for concentrating the effective spring function from said flow tube proximate said nodes;

said means for concentrating being effective for changing the effective spring rate of said balance bar and said flow tube in response to a presence of materials of different densities in said flow tube at different times;

flow tube stubs connecting end portions of said flow tube proximate said brace bar means to ends of said case;

said flow tube stubs include bellows proximate said brace bar means for reducing the spring rate from said flow tube stub to isolate said brace bar dynamically from said case ends;

said brace bar means containing substantially the entire spring function of said Coriolis flowmeter for maintaining a dynamic balance of said Coriolis flowmeter by altering the spring rate ratio of segments of said brace bar means while materials of different densities are extant in said flow tube; and sensor means positioned proximate said flow tube for detecting Coriolis oscillations of said flow tube generated by a flow of material through said flow tube while said flow tube is vibrated by said driver means;

said sensor means being effective in response to said detecting for generating output signals representing at least one characteristic of said flowing material.

16. A method of dynamically balancing a Coriolis flowmeter comprising a balance bar and a flow tube oriented substantially parallel to each other;

brace bar means connecting end portions of said balance bar to a reference mass;

said brace bar means connecting said end portions of said balance bar to said flow tube; said method comprising the steps of:

vibrating said balance bar and said flow tube transversely out of phase with respect to each other to place a vibrational node on one of said balance bar, said brace bar means or said flow tube;

said vibrational node acting to separate the effective spring function of said flow tube from the effective spring function of said balance bar;

concentrating said effective spring function of said balance bar proximate said node;

said step of concentrating being effective for changing the effective spring function of said balance bar in response to the presence of materials of different densities in said flow tube at different times;

said step of concentrating further being effective to provide an improved dynamic balance of said Coriolis flowmeter.

17. The method of claim 16 wherein said step of concentrating the spring function of said balance bar includes the step of providing a mid portion of said balance bar having a greater flexibility than the remainder of said balance bar.

18. The method of claim 17 wherein said step of concentrating includes the step of including a cut away function in said mid portion of said balance bar.

19. The method of claim 17 further comprising the step of concentrating the effective spring function of said flow tube proximate said node for changing the effective spring function of said flow tube in response a presence of materials of different densities in said flow tube at different times.

20. The method of claim 19 wherein said step of concentrating the spring function of said flow tube includes the step of including a bellows in a mid portion of said flow tube.

21. The Coriolis flowmeter of claim 16 wherein said reference mass comprises a case and wherein said method further comprises the steps of:

surrounding said balance bar and said flow tube and said brace bar means with said case so that a longitudinal axis of said case is substantially parallel to said balance bar and said flow tube; and connecting said brace bar means to an inner wall portion of said case for preventing vibrational translations of said brace bar means with respect to said case in response to the out of phase vibration of said balance bar and said flow tube with respect to each other.

22. The method of claim 21 wherein said connecting means comprises links shaped to permit the rotation of said brace bar with respect to said case while preventing vibrational translations of said brace bar means with respect to said case;

said method further including the step of rotating said brace bar means with respect to said links about an axis perpendicular to a longitudinal axis of said balance bar and said flow tube.

23. The method of claim 22 wherein said links are hour glass shaped and wherein said step of rotating includes the step of rotating said links so that a first portion of each of said links rotates with respect to a second portion of each of said links in response to the rotation of said brace bar means wherein a narrow neck portion of said hour glass shaped links facilitates said rotation.

24. The method of claim 21 further including the steps of connecting an end portion of said flow tube proximate said brace bar means via flow tube stubs to ends of said case.

25. The method of claim 24 further including the step of employing bellows in said flow tube stubs proximate said brace bar to reduce the effective spring function from said flow tube stub to isolate said brace bar means dynamically from said case ends.

26. A Coriolis flowmeter comprising:

a flow tube and a balance bar oriented substantially parallel to each other;

brace bar means connecting end portions of said balance bar to said flow tube;

a case;

connecting link means for connecting said case to said brace bar means;

driver means for vibrating said balance bar and said flow tube transversely out of phase with respect to each other;

said connecting link means having a substantially flat surface oriented substantially perpendicular to a longitudinal axis of said balance bar and shaped to permit a rotation of said brace bar means with respect to said case while preventing vibrational translations of said brace bar means with respect to said case;

said rotation of said brace bar means being about an axis perpendicular to said longitudinal axis of said flow tube and extending from said brace bar means to said case:

said substantially flat surface of each of said connecting link means is substantially hour glass shaped so as to define a first end and a narrow mid portion and a second end;

said first end of said connecting link means is connected to said brace bar means and said second end is connected to an inner wall portion of said case;

said mid portion of said connecting links having a low torsional spring rate to enable a rotation of said brace bar means with respect to said case;

said mid portion being of sufficient strength to prevent vibrational translations of said brace bar means with respect to said case:

each of said connecting link means further includes a gusset member defining a planar surface connected between said balance bar and said connecting link means;

said gusset member having a first side affixed to a an outer surface of said balance bar with said first side being aligned substantially parallel to said longitudinal axis of said balance bar;

said gusset member having a second side substantially perpendicular to said first side and affixed to said substantially flat surface of said connecting link means;

said gusset member being effective to raise a lateral vibrational frequency of said balance bar while leaving substantially unaffected a drive vibrational frequency imparted to said balance bar in a direction perpendicular to said lateral vibrational frequency.

27. A Coriolis flowmeter comprising:

a flow tube and a balance bar oriented substantially parallel to each other;

brace bar means connecting end portions of said balance bar to said flow tube;

a case;

connecting link means for connecting said case to said brace bar means;

driver means for vibrating said balance bar and said flow tube transversely out of phase with respect to each other;

said connecting link means having a substantially flat surface oriented substantially perpendicular to a longitudinal axis of said balance bar and shaped to permit a rotation of said brace bar means with respect to said case while preventing vibrational translations of said brace bar means with respect to said case;

said rotation of said brace bar means being about an axis perpendicular to said longitudinal axis of said balance bar and extending from said brace bar means to said case:

a first end of each of said connecting link means is connected to said brace bar means;

a second end of each of said connecting link means is connected to an inner wall portion of said case;

each of said connecting link means further includes a gusset member defining a planar surface connected between said balance bar and said connecting link means;

said gusset member having a first side affixed to a an outer surface of said balance bar with said first side being aligned substantially parallel to said longitudinal axis of said balance bar;

said gusset member having a second side substantially perpendicular to said first side and affixed to said substantially flat surface of said connecting link means;

said gusset member being effective to raise a lateral vibrational frequency of said balance bar while leaving substantially unaffected a drive vibrational frequency imparted to said balance bar by said driver means in a direction perpendicular to said lateral vibrational frequency.

* * * * *